United States Patent [19]

Kubo

[11] Patent Number: 4,765,307

[45] Date of Patent: Aug. 23, 1988

[54] GUIDE PULLEY BASE FOR WIRE SAW

[75] Inventor: Setsuo Kubo, Kyoto, Japan

[73] Assignee: Kabushiki Kaisha Dymosha, Kyoto, Japan

[21] Appl. No.: 37,242

[22] Filed: Apr. 10, 1987

[30] Foreign Application Priority Data

| Apr. 12, 1986 | [JP] | Japan | 61-55280[U] |
| Apr. 12, 1986 | [JP] | Japan | 61-55281[U] |
| Dec. 15, 1986 | [JP] | Japan | 61-298072 |

[51] Int. Cl.$^4$ .............................................. B28D 1/08
[52] U.S. Cl. .................................... 125/21; 125/12; 83/651.1
[58] Field of Search ............... 125/12, 21; 83/651.1, 83/661, 814, 816; 242/168, 189

[56] References Cited

U.S. PATENT DOCUMENTS

| 558,483 | 4/1896 | Clark | 299/35 |
| 753,092 | 2/1904 | Neukirch | 299/35 |
| 2,150,381 | 3/1939 | Lansing | 125/21 |
| 2,808,045 | 10/1957 | Cherreeau | 125/21 |
| 3,093,021 | 6/1963 | Barron | 83/661 X |
| 3,599,623 | 8/1971 | Phy | 125/21 |
| 4,633,848 | 1/1987 | Bresciani | 125/21 |

Primary Examiner—Frederick R. Schmidt
Assistant Examiner—Shirish Desai
Attorney, Agent, or Firm—Franklin D. Wolffe; Morris Fidelman

[57] ABSTRACT

A guide pulley base for wire saw having a pair of main pulleys on the same plane, a pair of guidance pulleys in parallel to each other in such a way that each outer periphery of the guidance pulley is in contact with each parallel tangent line contacting with each outer periphery of each main pulley from the opposing side of the main pulleys, and further at need, a pair of second guidance pulleys, a pair of second main pulleys and an auxiliary pulley.

The guide pulley base for wire saw is arranged between a wire drive unit and an object to be cut for guiding a cutting wire and smoothly turning the wire travel direction when an object to be cut such as ferroconcrete structure in a building, a bridge, a subway, etc. is cut off partially.

8 Claims, 7 Drawing Sheets

GUIDE PULLEY BASE FOR WIRE SAW

BACKGROUND OF THE INVENTION

1. Field of the Invention

The present invention relates to a guide pulley base for a wire saw, which is arranged between a wire drive unit and an object to be cut for guiding a cutting wire and smoothly turning the wire travel direction when an object to be cut such as ferroconcrete structure in a building, a bridge, a subway, etc. is cut off partially.

2. Description of the Prior Art

In wire saw cutting, an object is cut off by circularly moving an endless wire reeved around an object to be cut under a desired tension with a wire drive unit.

These wire saws are widely used for quarrying stone in stone pits. The cutting wire is manufactured by alternately fitting beads formed with diamond abrasive grains on the surface thereof and spacer coil springs to a steel wire rope.

In the wire saw cutting, guide pulleys are used for smoothly guiding the wire tensile side and the wire loose side, and also smoothly turning the wire travel direction according to the positional relationship between an object to be cut and the wire drive unit. For instance, when an object located at a position higher or lower than a road is required to be cut horizontally with a wire drive unit placed on the road, it is necessary to install a guide pulley between the object and the drive unit.

Conventionally, however, where a guide pulley is installed at a required position, many manhour and skill are required for adjusting pulley positions and pulley angles between some guide pulleys in order to smoothly drive the cutting wire, in addition to complicated installation and disassembling work. Further, in the prior art wire saw, it has been difficult to cut an object into an accurate dimension and at an accurate angle (e.g. horizontally) in spite of the fact that a plurality of pulleys are arranged.

In particular, when the prior-art wire saw is used to cut a ferroconcrete structure partially, there exists no wide area and large space enough to install many guide pulleys, being different from a stone pit (quarry), thus raising a problem in that cutting work period is prolonged because it takes much time to install, disassemble and adjust the guide pulleys.

SUMMARY OF THE INVENTION

With these problems in mind, therefore, it is the primary object of the present invention to provide a guide pulley base for wire saw which can guide the tensile side and the loose side of a cutting wire simultaneously and additionally smoothly turn the wire saw travel direction to any desired direction.

It is another object of the present invention to provide a guide pulley base for wire saw which can reduce the distance between the tensile side and the loose side of the cutting wire reeved around an object to be cut to any desired value, and additionally smoothly turn the wire toward the wire drive unit.

It is the other object of the present invention to provide a guide pulley base for a wire saw available for cutting a ferroconcrete structure.

To achieve the above-mentioned object, the guide pulley base for wire saw according to the present invention comprises a support frame, a pair of main pulleys rotatably supported by the support frame a distance apart from each other on the same plane, and a pair of guidance pulleys rotatably supported by the support frame in parallel to each other in such a way that each outer periphery of the guidance pulley is in contact with each parallel tangent line contacting with each outer periphery of each main pulley from the opposing side of the main pulleys.

The two main pulleys of the present invention serve to reduce a distance between the tensile side and the loose side of a cutting wire reeved around an object to be cut. Further, the guidance pulleys serve to guide the tensile and loose sides of the cutting wire at a reduced interval in parallel to each other along the above tangent lines in a plane including each guidance pulley.

The guide pulley base for wire saw according to the present invention is installed directly on an object to be cut or a road with anchors or other in such a way that the main pulleys are placed on the same plane along which an object is to be cut. After the cutting wire guidance installation has been completed relative to an object to be cut, a cutting wire is reeved around an object, the main pulleys, the guidance pulleys in accordance with a determined sequence, and further the tensile and loose sides of the cutting wire guided along the guidance pulleys are reeved around a wire drive unit, before driving the wire drive unit in order to cut the object.

In the guide pulley base for wire saw according to the present invention, when the base is installed at any given position, it is possible to simultaneously guide both the tensile and loose sides of the wire toward a desired direction without need of special adjustment work. Therefore, it is possible to conduct an accurate partial cutting, in particular to partially cut a ferroconcrete structure, irespective of the height of the cutting position. Further, the guide pulley base is usable at any places on the ground or within a small space.

BRIEF DESCRIPTION OF THE DRAWINGS

The present invention is more clearly illustrated in the accompanying drawings, wherein.

DETAILED DESCRIPTION OF THE PREFERRED EMBODIMENTS

Figure 1A:
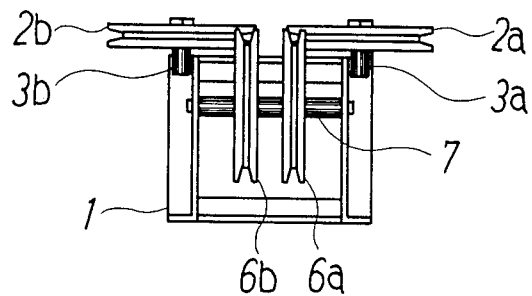
FIGS. 1A to 1C are front, side and planar views, respectively showing an embodiment of the guide pulley base for wire saw according to the present invention.

The embodiments of the present invention will be described hereinbelow with reference to the attached drawings. In an embodiment shown in FIGS. 1A to 1C, a pair of main pulleys 2a and 2b are rotatably supported by a support frame 1 via two shafts 3a and 3b on the same plane a predetermined distance apart from each other. Further, a pair of guidance pulleys 6a and 6b are each rotatably supported by the support frame 1 via a shaft 7 in parallel to each other in such a way that each outer periphery 5a or 5b of the guidance pulley 6a or 6b is in contact with each parallel tangent line Ta or Tb connecting with each outer periphery 4a or 4b of each of the main pulleys 2a and 2b from the opposing side of these two main pulleys 2a and 2b. In this embodiment, each of the guidance pulleys 6a and 6b is disposed at a right angle with each of the main pulleys 2a and 2b. In other words, the tangent line Ta or Tb is in contact with each outer periphery 4a or 4b of each main pulley 2a or 2b at a point Pa or Pb, respectively and also with each periphery 5a or 5b of each guidance pulley 6a or 6b at a point Qa or Qb.

Figure 1B:
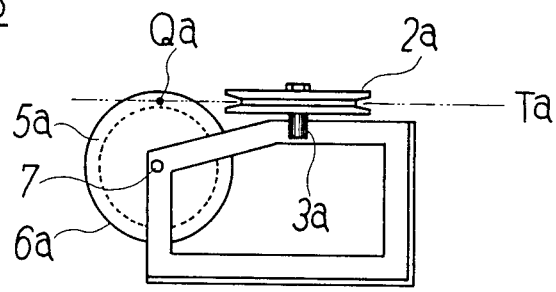
Figure 1C:
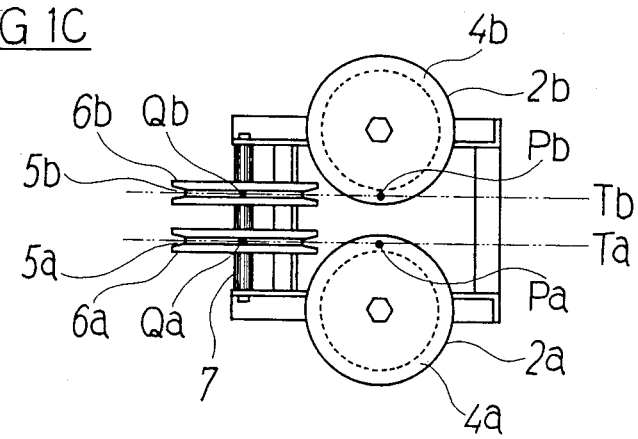
Figure 2A:
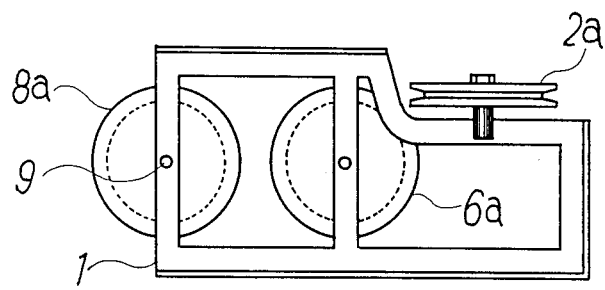
FIGS. 2A and 2B are side and planar views, respectively showing another embodiment of the guide pulley base for wire saw according to the present invention, in which second guidance pulleys are additionally provided.
Figure 2B:
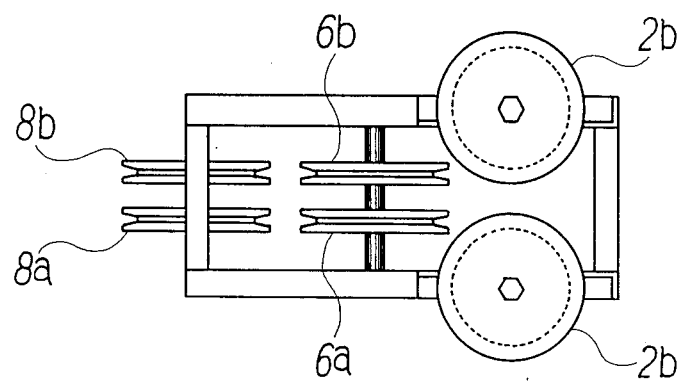

In another embodiment shown in FIGS. 2A and 2B, additional second guidance pulleys 8a and 8b are rotatably supported by the support frame 1 via a shaft 9 being flush with each guidance pulley 6a or 6b, in addition to the construction of the embodiment shown in FIGS. 1A to 1C. In this embodiment, the second guidance pulleys 8a and 8b are also disposed, respectively at a right angle with the main pulleys 2a and 2b, in the same way as in the guidance pulleys 6a and 6b.

Figure 3A:
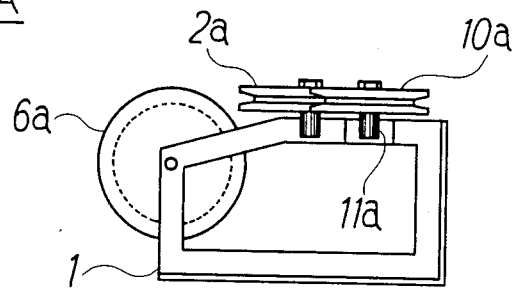
FIGS. 3A and 3B are side and planar views, respectively showing another embodiment of the guide pulley base for wire saw according to the present invention, in which second main pulleys are additionally provided.
Figure 3B:
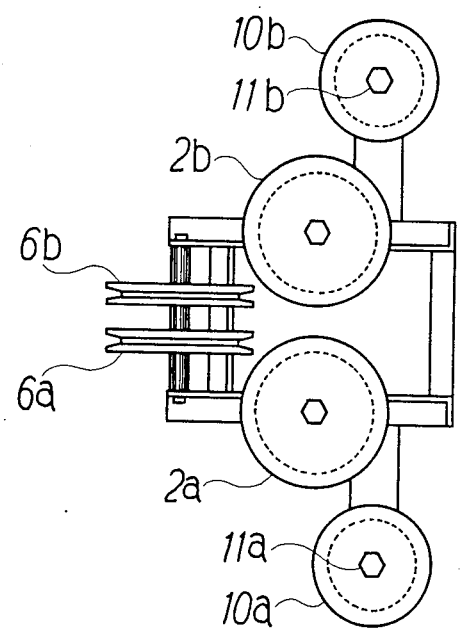

In another embodiment shown in FIGS. 3A and 3B, additional second main pulleys 10a and 10b are rotatably supported separately by the support frame 1 via two shafts 11a and 11b being flush with the main pulleys 2a and 2b outside the main pulleys 2a and 2b, respectively, in addition to the construction of the embodiment shown in FIGS. 1A to 1C.

Figure 4A:
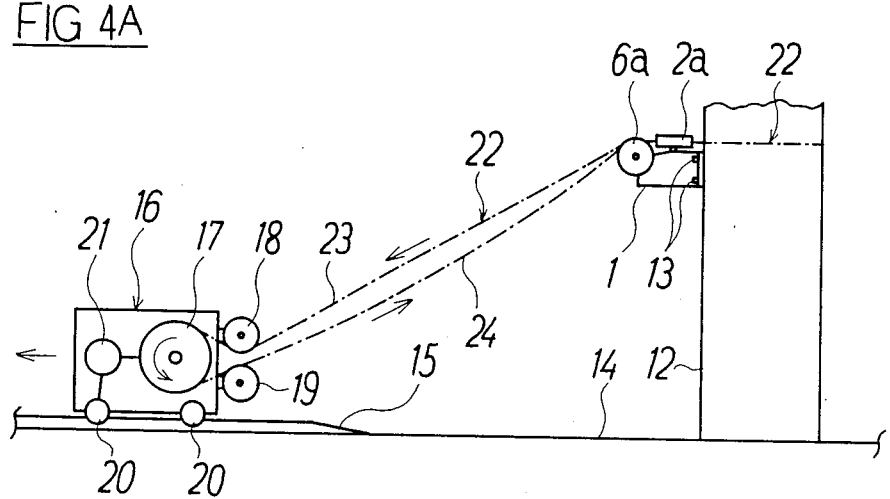
FIGS. 4A and 4B are side and planar views for assistance in explaining the method of using the guide pulley base for wire saw shown in FIGS. 1A to 1C.
Figure 4B:
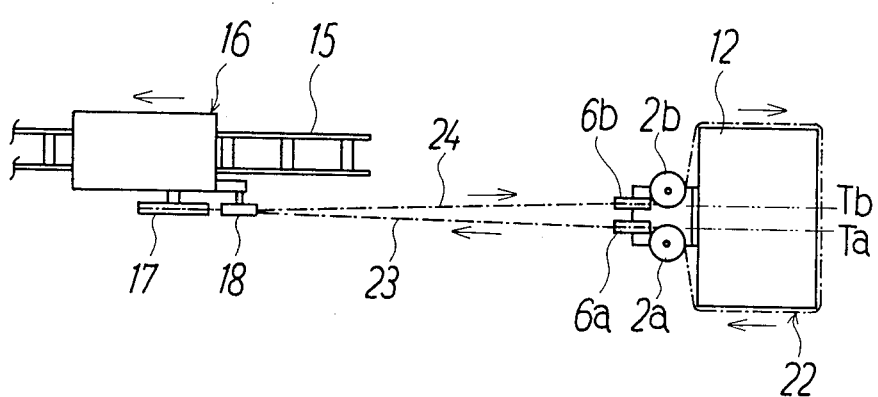

The guide pulley base shown in FIGS. 1A to 1C can be used in accordance with the method as shown in FIGS. 4A and 4B.

That is, the support frame 1 is fixed to a wall surface of an object to be cut 12 by anchors 13 in such a way that the outer peripheries 4a and 4b of the main pulleys 2a and 2b face the wall surface of the object 12 to be cut. On the other hand, rails 15 are laid on a road surface 14 in front of the object 12 and a wire drive unit 16 is movably placed on the rails 15. This wire drive unit 16 is provided with a wire drive pulley 17, a tensile-side tension pulley 18 and a loose-side tension pulley 19 adjacent to the drive pulley 17 on the same plane, wheels 20 fitted to the rails 15, and a drive mechanism 21 for driving the wire drive pulley 17 and the wheels 20. Further, an endless cutting wire 22 is reeved between the object 12 and the wire drive pulley 17 by way of the main pulleys 2a and 2b, the guidance pulleys 6a and 6b, and the tensile-side tension pulley 18, the loose-side tension pulley 19.

In this case, the tensile-side 23 of the cutting wire 22 is guided from the object 12 to the main pulley 2a and then from the main pulley 2a to the guidance pulley 6a along the tangent line Ta. On the other hand, the loose-side 24 of the cutting wire 22 is guided from the guidance pulley 6b to the main pulley 2b along the tangent line Tb and then reeved from the main pulley 2b to the object 12. Further, in the above case where the wire drive pulley 17 is disposed vertically as shown in FIGS. 4A and 4B, although the tensile-side 23 and the loose-side 24 of the cutting wire 22 are driven being a little twisted between the guidance pulleys 6a, 6b and the tensile-side and loose-side tension pulleys 18, 19, there exists no trouble in practice.

In the above arrangement, when a drive mechanism 21 of the wire drive unit 16 is operated, the wire drive pulley 17 and the wheels 20 rotate, so that the cutting wire 22 is circularly moved and pulled in the direction away from the object 12 to cut off the object 12 horizontally.

Figure 5A:
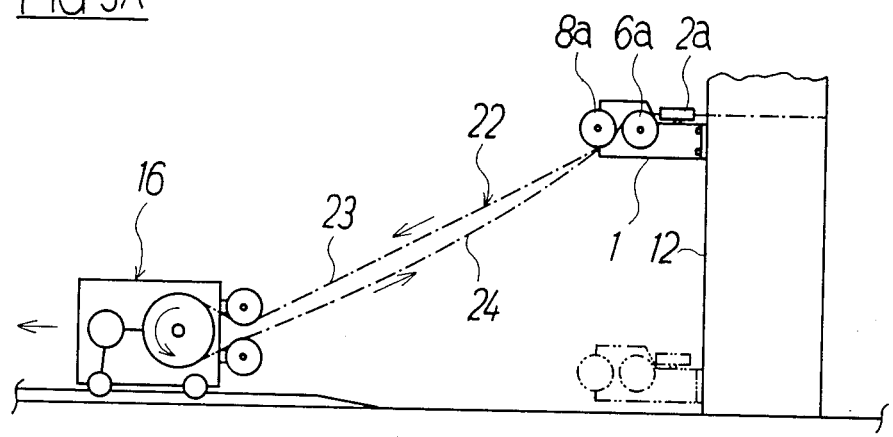
FIGS. 5A and 5B are side and planar views, respectively for assistance in explaining the method of using the guide pulley base for wire saw shown in FIGS. 2A and 2B.
Figure 5B:
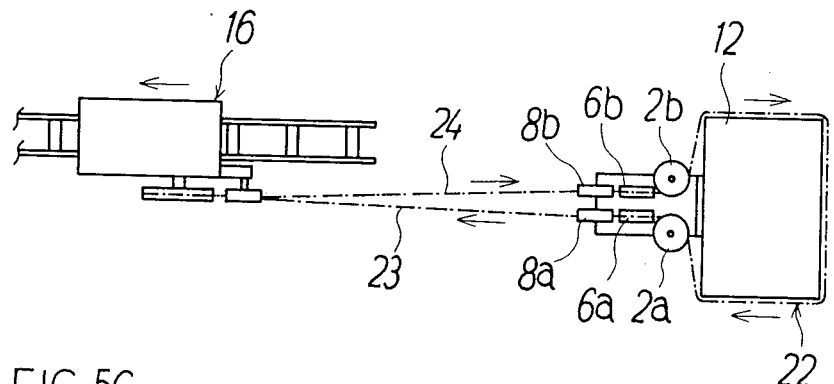

The guide pulley base shown in FIGS. 2A and 2B are used in practice by the method as shown in FIGS. 5A and 5B. The method is basically the same as that shown in FIGS. 4A and 4B except that the tensile side 23 and the loose side 24 of the cutting wire 22 are guided in S-shape state between the guidance pulleys 6a, 6b and the second guidance pulleys 8a, 8b, respectively as depicted in FIG. 5A. In this embodiment, if the second guidance pulleys 8a and 8b are not used, the guide pulley base is used in the same way as that shown in FIGS. 4A and 4B.

Figure 5C:
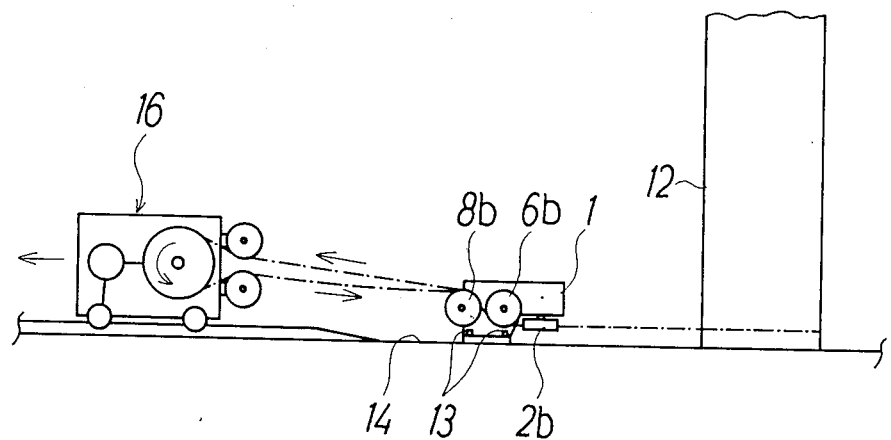
FIG. 5C is a side view for assistance in explaining the other method of using the same guide pulley base for wire saw.

Further, in the guide pulley base in which the second guidance pulleys 8a and 8b are used as shown in FIGS. 5A and 5B so that the cutting wire 22 is guided in S shape state, it is possible to stably hold the cutting wire 22. Further, this embodiment is more effectively used when an object to be cut is located at a position lower than the wire drive unit 16 as depicted dot-dot-dashed lines in FIG. 5A. Another method of using the guide pulley base is shown in FIG. 5C, in which the support frame 1 is fixed on a road 14 with anchors 13 at a position between the wire drive unit 16 and the object to be cut 12, in such a way that the main pulleys 2a and 2b face the road surface 14 to cut off the root portion of the object to be cut 12.

Figure 6A:
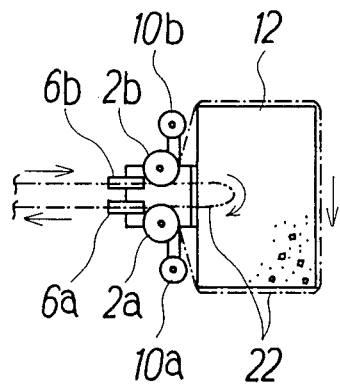
FIGS. 6A and 6B are planar views for assistance in explaining the method of using the guide pulley base for wire saw shown in FIGS. 3A and 3B.
Figure 6B:
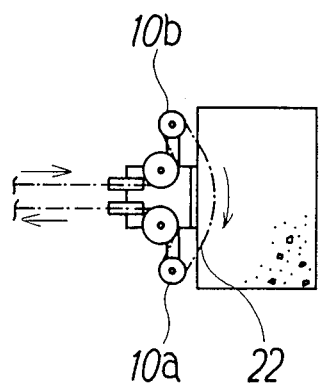

The guide pulley base as shown in FIGS. 3A and 3B are used by the method as shown in FIGS. 6A and 6B, for instance. In this method, the object 12 is started to be cut in the same way as shown in FIGS. 4A and 4B, without use of the second main pulleys 10a and 10b as depicted in FIG. 6A. When the object 12 has been cut to an extent and therefore the curvature of the cutting wire 22 reeved around the object 12 changes to a small diameter as shown by the dot-dot-dashed lines, the cutting wire 22 is rereeved around the second main pulleys 10a and 10b into S shape state in cooperation with the main pulleys 10a and 10b to increase the radius of curvature of the cutting wire 22 as shown in FIG. 6B. In other words, this method serves to prevent the damage or breakage of the cutting wire 22 caused when the cutting wire 22 reeved around the object 12 is bent sharply into a small diameter near the end of the cutting process.

Figure 7A:
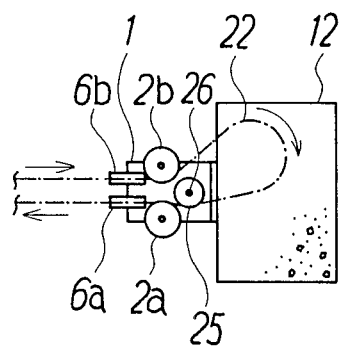
FIGS. 7A and 7B are diagrammatical planar views showing another embodiment of the guide pulley base for wire saw according to the present invention and the function thereof, in which an auxiliary pulley is additionally provided.
Figure 7B:
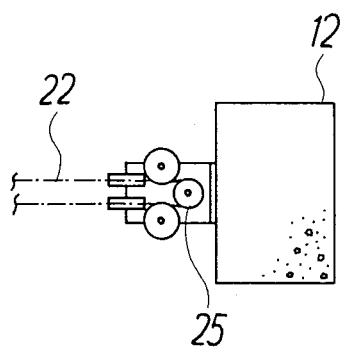

As already describe, it is also possible to provide an auxiliary pulley 25 having a diameter larger than a space formed between the two guidance pulleys 6a and 6b on the support frame 1 through a shaft 26, as shown in FIGS. 7A and 7B, at a position remote from the main pulleys 2a and 2b on the opposite side from the guidance pulleys 6a and 6b on the same plane as the main pulleys 2a and 2b. This auxiliary pulley 25 is used for guiding the cutting wire 22 as shown in FIG. 7A near the cutting process end to prevent the cutting wire 22 from being removed from the main pulley 2a or 2b. Further, this auxiliary pulley 25 functions as a stopper which prevents the cutting wire 22 from flying apart from the object 12 to be cut simultaneously when the object has been cut off completely.

Figure 8:
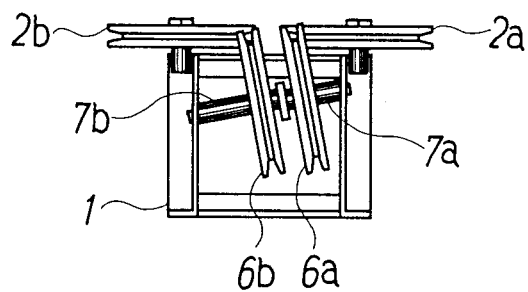
FIG. 8 is a diagrammatical front view showing the other embodiment of the guide pulley base for wire saw according to the present invention, in which the guidance pulleys are inclined at an angle less than 90 degrees with respect to the main pulley.

In the guide pulley base as described above, it is possible to incline the guidance pulleys 6a and 6b at an angle less than 90 degrees with respect to the main pulleys 2a and 2b. FIG. 8A shows an example where the guidance pulleys 6a and 6b are supported by the support frame 1 at an inclination angle through shafts 7a and 7b, respectively, in the basic embodiment shown in FIGS. 1A to 1C. In this connection, when the guidance pulleys 6a and 6b are inclined in the guide pulley base shown in FIGS. 2A and 2B, it is of course necessary to incline the second guidance pulleys in the same way. In these inclined guide pulley base, it is possible to cut the object 12 obliquely by arranging the guidance pulleys 6a and 6b vertically and fixing the support frame 1 to the object to be cut 12.

In the guide pulley base as described above, it is preferable to dispose a cover member for covering the cutting wire 22, when necessary, to prevent a removal of the cutting wire 22.

Figure 9A:
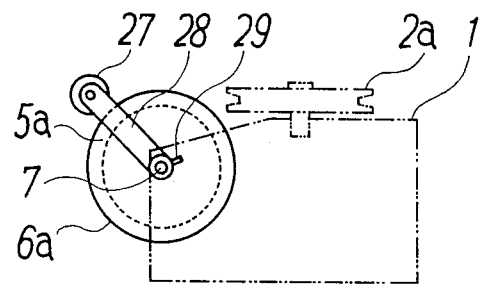
FIGS. 9A and 9B are side views, respectively showing wire removal prevention members available for the guide pulley base for wire saw according to the present invention.

FIG. 9A shows an example of wire removal prevention member, in which a roller 27 serving as a cover member is disposed at a given position along the outer periphery 5a of the guidance pulley 6a. This roller 27 is supported by two pivotal arms 28 pivotally supported around the shaft 7 of the guidance pulley 6a in such a way as to sandwich both side surfaces of the guidance pulley 6a. Further, the pivotal arm 28 is fixed to a given pivotal position by a pin 29.

Figure 9B:
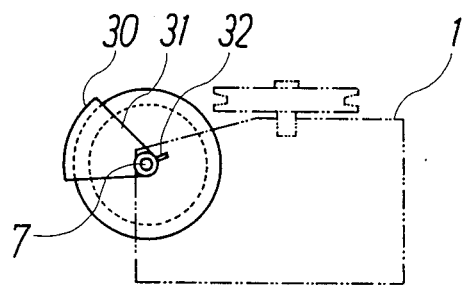

FIG. 9B shows another example thereof, in which a circular arc shaped fender 30 serving as a cover member is disposed at a given position along the outer periphery 5a of the guidance pulley 6a. This fender 30 is connected to two fan-shaped pivotal arms 13 pivotably supported around the shaft 7 of the guidance pulley 6a in such a way as to sandwich both side surfaces of the guidance pulley 6a.

Further, the pivotal arm 31 is fixed to a given pivotal position by a pin 32. Furthermore, other wire removal prevention members as described above may be disposed for the second guidance pulleys 8a and 8b or other, where necessary.

As many apparently widely different embodiments of this invention may be made without departing from the spirit and scope thereof, it is to be understood that the invention is not limited to the specific embodiments thereof except as defined in the appended claims.

What I claim is:

1. A guide pulley base for wire saw comprising a support frame, a pair of main pulleys rotatably supported by the support frame a distance apart from each other on the same plane, and a pair of guidance pulleys rotatably supported by the support frame in parallel to each other on separate planes and in such a way that the outer periphery of each guidance pulley is in contact with a tangent line through the outer periphery of each main pulley wherein each of the guidance pulleys are disposed perpendicularly or at an oblique angle with each of the main pulleys.

2. A guide pulley base for wire saw according to claim 1, wherein a pair of second guidance pulleys are rotatably supported by the support frame in parallel to each other on the same plane as each guidance pulley.

3. A guide pulley base for wire saw according to claim 1, wherein a pair of second main pulleys are rotatably supported by the support frame on the same plane as the main pulleys outside the main pulleys.

4. A guide pulley base for wire saw according to claim 1, 2 or 3, wherein an auxiliary pulley having a diameter larger than a space formed between the two guidance pulleys on the support frame, is rotatably supported by the support frame at a position adjacent to the main pulleys on the opposite side from the guidance pulleys on the same plane as the main pulleys.

5. A guide pulley base for wire saw according to claim 1, 2 or 3, wherein the guidance pulleys are disposed at a right angle with the main pulleys.

6. A guide pulley base for wire saw according to claim 1, 2 or 3, wherein the guidance pulleys are disposed at an angle less than 90 degrees with respect to the main pulleys.

7. A guide pulley base for wire saw according to claim 1, 2 or 3, wherein a cover member is disposed along the outer periphery of the pulley through pivotal arms sandwiching both side surfaces of the pulley.

8. A guide pulley base for wire saw comprising a support frame, a pair of main pulleys rotatably supported by the support frame a distance apart from each other on the same plane, and a pair of guidance pulleys rotatably supported by the support frame in parallel to each other in such a way that the outer periphery of each guidance pulley is in contact with a tangent line through the outer periphery of each main pulley, wherein a cover member is disposed along the outer periphery of one of the two guidance pulleys through pivotal arms sandwiching both side surfaces of said one pulley.

* * * * *